United States Patent
Koors et al.

(10) Patent No.: US 6,802,381 B1
(45) Date of Patent: Oct. 12, 2004

(54) PROPULSION MECHANISM HAVING SPHERICAL BALL

(75) Inventors: Mark A. Koors, Kokomo, IN (US); Andrew R. Baker, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/409,733

(22) Filed: Apr. 9, 2003

(51) Int. Cl.[7] ............................................. B62D 57/036
(52) U.S. Cl. ...................................................... 180/7.1
(58) Field of Search .................................. 180/20, 7.1

(56) References Cited

U.S. PATENT DOCUMENTS

| | | | | |
|---|---|---|---|---|
| 2,104,636 A | * | 1/1938 | Russell ........................ | 40/411 |
| 4,861,053 A | * | 8/1989 | Yeomans, Jr. ............... | 280/205 |
| 5,906,247 A | * | 5/1999 | Inoue .......................... | 180/20 |
| 6,298,934 B1 | * | 10/2001 | Shteingold .................. | 180/10 |
| 6,498,948 B1 | | 12/2002 | Ozawa et al. | |

FOREIGN PATENT DOCUMENTS

JP          04201793 A   *  7/1992  ............ B62K/1/00

* cited by examiner

*Primary Examiner*—Lesley D. Morris
*Assistant Examiner*—Paul Royal, Jr.
(74) *Attorney, Agent, or Firm*—Stefan V. Chmielewski

(57) ABSTRACT

A propulsion mechanism is provided for driving a vehicle having a frame and socket. The propulsion mechanism has a spherical ball disposed within the socket and adapted to frictionally engage the ground surface. First and second powered drive members are frictionally engaged with the spherical ball and powered to rotate the spherical ball to propel the vehicle. The first and second powered drive members drive the spherical ball in first and second directions and may be operated simultaneously.

17 Claims, 3 Drawing Sheets

US 6,802,381 B1

PROPULSION MECHANISM HAVING SPHERICAL BALL

TECHNICAL FIELD

The present invention generally relates to a vehicle drive system and, more particularly, to a surface engaging propulsion mechanism for driving and steering a vehicle.

BACKGROUND OF THE INVENTION

Self-propelled land-based vehicles, such as automotive vehicles and robots, typically employ a power unit, such as an internal combustion engine or electric motor, a drivetrain for transferring power to one or more drive axles, and a plurality of wheels for frictionally engaging a ground surface to propel the vehicle in a steered direction. Conventional wheeled vehicles include rotatable drive wheels that frictionally engage the ground and are used as the propulsion mechanism to drive and steer the vehicle in a desired direction. The wheels are actuated by the power driven axle to turn about the rotary drive axis, and the wheels are turned left and right within a steering range to control directivity of the vehicle. In most vehicles, a steered wheel has a limited range of angular movement.

Some vehicles employ independently rotatable drive wheels as the propulsion mechanisms to provide enhanced turning ability. For example, four wheel steering systems have been introduced which allow all four wheels on a passenger vehicle to be turned to steer the vehicle. Other examples of independently steered wheels are found on robotic vehicles which employ propulsion mechanisms commonly referred to as swerve or crab steering.

While conventional wheeled propulsion mechanisms are widely used on automotive vehicles and robots, there exists a number of shortcomings in some of these wheeled vehicle designs. The steering assembly mechanism required to turn the wheels typically requires numerous components. Additionally, the steering control systems that are generally required to turn the wheels are complex and generally require many sensors and a great amount of software development. Thus, sophisticated steered wheel systems are generally expensive. Further, conventional steered wheel propulsion mechanisms generally experience a time delay to turn the wheels toward the path of the desired direction, due to the fact that the wheels may be turned throughout a wide turning radius.

It is therefore desirable to provide for a propulsion mechanism for driving a ground operated vehicle, which offers reduced time to steer the vehicle, reduced components, and reduced cost. It is further desirable to provide for such a propulsion mechanism which may be employed on any of a number of mobile vehicles.

SUMMARY OF THE INVENTION

In accordance with the teachings of the present invention, a propulsion mechanism is provided for driving a vehicle having a frame and a socket provided in the frame. According to one aspect of the present invention, the propulsion mechanism includes a spherical ball disposed within the socket and adapted to frictionally engage a surface. A first powered drive member is frictionally engaged with the spherical ball and is powered to rotate the spherical ball to propel the vehicle. A second powered drive member is frictionally engaged with the spherical ball and is powered to rotate the spherical ball to propel the vehicle. The first powered drive member drives the spherical ball in a first axis and the second powered drive member drives the spherical ball in a second axis.

According to another aspect of the present invention, the propulsion mechanism includes a spherical ball disposed in the socket of the frame, and a friction reducing load member disposed between the spherical ball and the frame for allowing the spherical ball to rotate relative to the frame. The propulsion mechanism further includes a powered drive member frictionally engaged with the spherical ball. The drive member is powered to rotate the spherical ball to drive the vehicle.

Accordingly, the propulsion mechanism of the present invention advantageously drives and steers a vehicle by employing a spherical ball frictionally engaged by drive members. According to a further aspect, the first and second drive members are controllably actuated so as to provide controlled steering of the vehicle in any of a number of directions.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
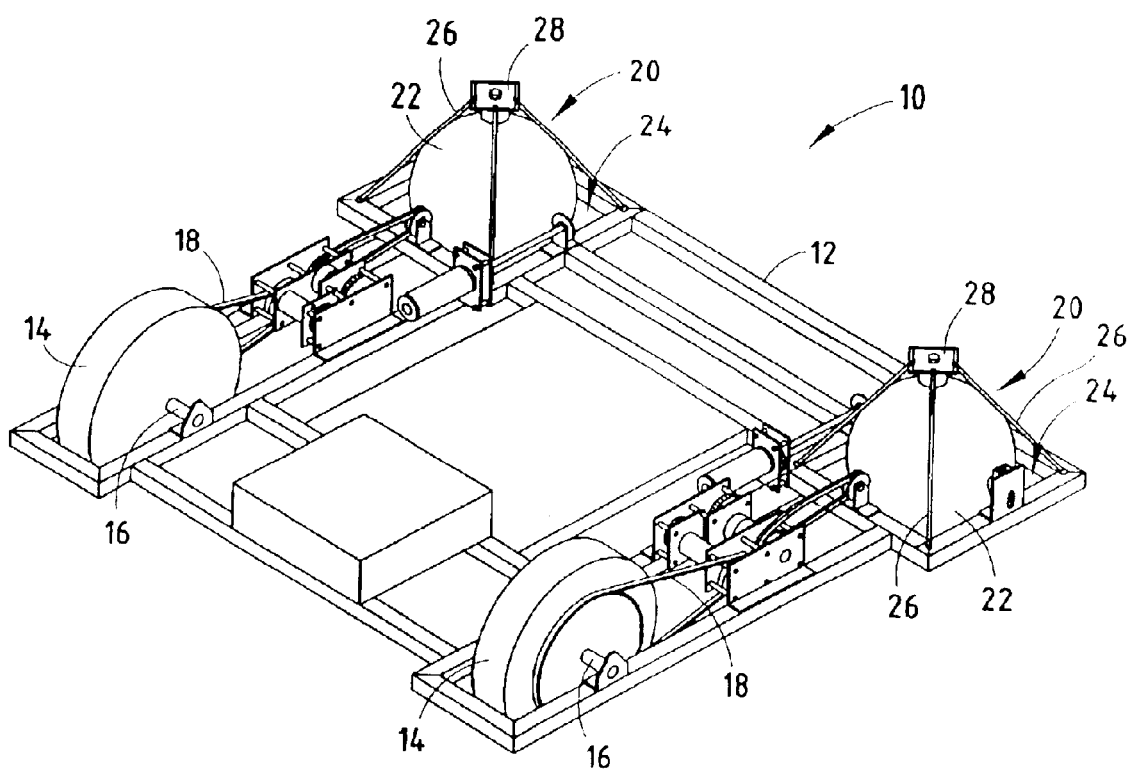
FIG. 1 is a perspective view of a mobile robot vehicle employing a pair of propulsion mechanisms according to the present invention.

Referring to FIG. 1, a ground-based mobile vehicle 10 is generally illustrated employing first and second propulsion mechanisms 20 for driving and steering the vehicle 10 according to the present invention. The mobile vehicle 10 is generally shown in one embodiment as a robot. However, the mobile vehicle 10 may include any of a number of powered and steerable ground-based vehicles, including but not limited to automotive passenger transport vehicles, light and heavy industrial machinery, and robots, which require a propulsion mechanism to drive and steer the vehicle in a desired direction.

The vehicle 10 is generally depicted having a rigid structural frame 12, generally supported by a pair of rear wheels 14 and the pair of powered front steerable propulsion mechanisms 20. The rear wheels 14 are each rotatable about an axle, 16, and are shown driven by powered rear drive linkage 18. While a pair of rear wheels 14 are shown for supporting the rear end of the vehicle 10, it should be appreciated that any of a number of various types of rear support structures may be employed to support the vehicle 10. The rear wheels 14 or other supportive structures may be driven as shown or may, alternatively, not be driven.

The first and second propulsion mechanisms 20 are generally provided near the left and right front corners of the vehicle 10. Each propulsion mechanism 20 includes a spherical ball 22 generally disposed within a socket 24 formed within the vehicle frame 12. The spherical ball 22 protrudes out the bottom of the socket 24 and is adapted to engage the ground surface and support and drive the vehicle 10 on the ground surface. The socket 24 may include any of a number of open or closed sockets that include an opening cavity formed in the frame 12. In the example shown, each socket 24 includes an open socket generally defined by an opening in the frame 12 and further defined by the area between upstanding support members 26 and upper support member 28.

Figure 2:
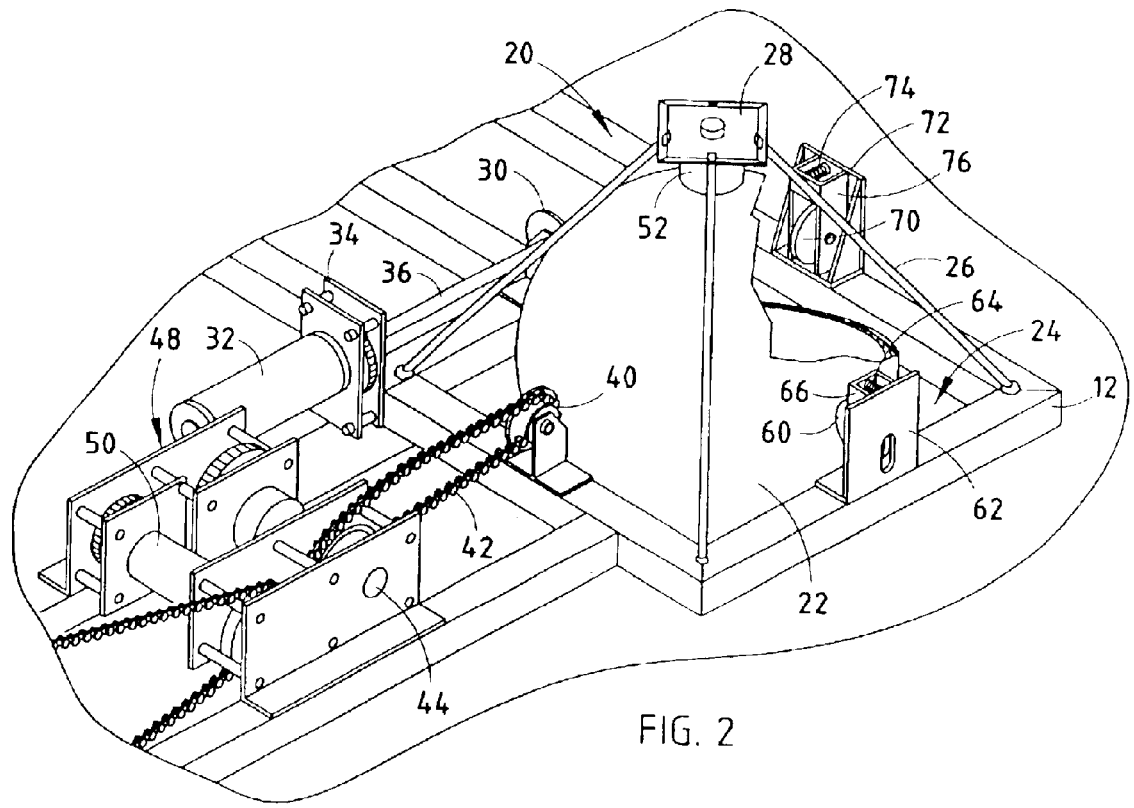
FIG. 2 is an enlarged perspective view of one of the propulsion mechanisms with the ball partially cut-away.
Figure 3:
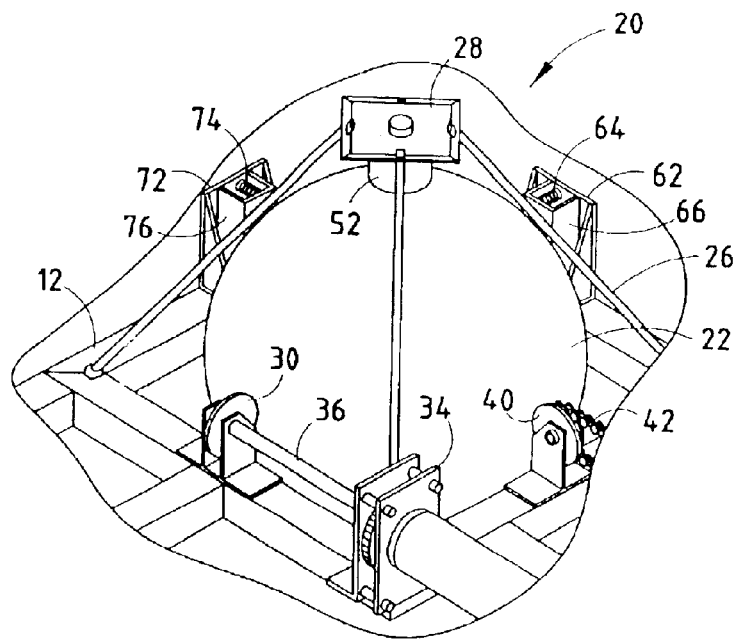
FIG. 3 is a partial perspective view of the propulsion mechanism shown in FIG. 2, rotated ninety degrees (90°)

The propulsion mechanism 20 is further illustrated in greater detail in FIG. 2 and is also shown rotated ninety degrees (90°) in FIG. 3. The spherical ball 22 is shown disposed within socket 24 and in frictional engagement with a first drive member 30 and a second drive member 40. The spherical ball 22 includes a hollow ball having a frictional surface for engaging with a pair of drive members, for engaging the ground surface, and for further engaging friction reducing load members as described herein. The spherical ball 22 may include a hollow metal ball having a high-traction material (e.g., rubber) coated on the outer surface to provide an enhanced friction surface. Accordingly, the spherical ball 22 is able to rotate in any of a number of steerable directions within the socket 24 as controlled by the first and second drive members 30 and 40 to drive and steer the vehicle 10.

The first drive member 30 may include a first drive wheel oriented vertically and connected to a drive shaft 36 which, in turn, is coupled to a gearbox assembly 34 driven by an electric motor 32. In one embodiment, the gearbox assembly 34 may include multiple gears arranged to operate as a transmission. The first drive member 30 frictionally engages the spherical ball 22 to drive the spherical ball 22 in a first direction in response to actuation from electric motor 32.

The second powered drive mechanism 40 is located substantially orthogonal (i.e., 90°) to the first powered drive mechanism 30 and may include a vertically oriented second drive wheel frictionally engaging the spherical ball 22. The second powered drive mechanism 40 is driven by a drive chain 42 which, in turn, is connected to a coupler 44 and a gearbox assembly 48. In one embodiment, the gearbox assembly 48 may include multiple gears arranged to operate as a transmission. The gearbox assembly 48, in turn, is driven by a second electric motor 50. Accordingly, the second drive member 40 frictionally engages the spherical ball 22 and is powered by electric motor 50 so as to rotate the spherical ball 22 in a second direction substantially orthogonal to the first direction of the first drive mechanism 30.

To allow for reduced friction rotational movement of the spherical ball 22 relative to the vehicle frame 12 and upper supporting structures 26 and 28, the propulsion mechanism 20 includes friction reducing load members that support the positioning of the spherical ball 22 within socket 24 and allow rotational movement relative thereto. A first friction reducing load member 60 is located substantially on the opposite side (i.e., 180°) of the spherical ball 22 from the first drive member 30. The first friction reducing load member 60 may include a vertically oriented load wheel in frictional contact with spherical ball 22. The first friction reducing load wheel 60 is connected to an inwardly biased support arm 66 which is biased inward from a rigidly mounted bracket 62 via a bias spring 64. Accordingly, the first friction reducing load member 60 is biased radially inward towards the spherical ball 22 so as to preload the spherical ball 22.

A second friction reducing load member 70 is located substantially on the opposite side (i.e., 180°) of the spherical ball 22 from the second drive member 40. The second friction reducing load member 70 may likewise include a vertically oriented wheel frictionally engaging the spherical ball 22. The second friction reducing load member 70 is likewise connected to a support arm 76 which is biased inward from a rigidly mounted bracket 72 via bias spring 74. Accordingly, the second friction reducing load member 70 is biased radially inward towards the spherical ball 22 so as to preload the spherical ball 22.

In addition to providing friction reducing load members 60 and 70 on opposite sides of the first and second powered drive members 30 and 40, respectively, an upper friction reducing member 52 is disposed below the upper support 28 to provide a friction reducing contact point on top of the spherical ball 22. The upper friction reducing load member 52 may include a ball transfer caster having a ball that is free to rotate within a caster assembly and, thus, allows for rotation of spherical ball 22 relative to frame 12.

Figure 4:
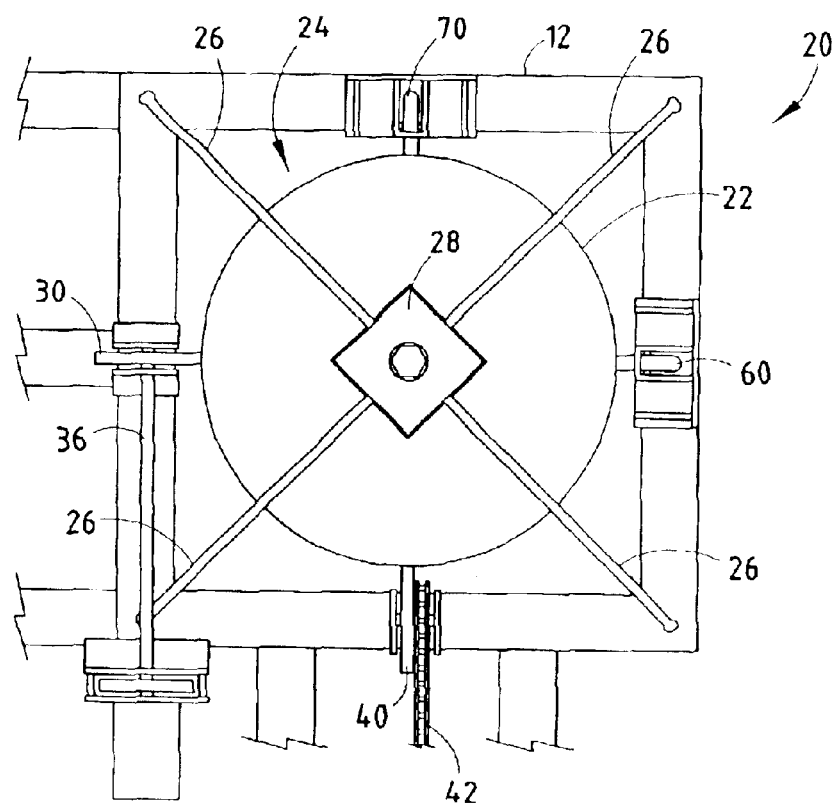
FIG. 4 is a top view of the propulsion mechanism.

Referring to FIG. 4, the first and second drive members 30 and 40 are shown oriented in relation to the opposing first and second friction reducing load members 60 and 70. It should be appreciated that the first and second friction reducing load members 60 and 70 preload the spherical ball 22 to maintain the position of the spherical ball 22 centrally located within socket 24 and provide an opposing bias force to force the spherical ball 22 against first and second drive members 30 and 40 while allowing low friction rotation of the spherical ball 22. The spherical ball 22 may be driven by one of the first and second drive members 30 and 40 to drive and steer the vehicle 10 in a first direction or a second direction. The first and second drive members 30 and 40 may also be controllably operated simultaneously to drive the vehicle 10 in any of a number of directions to achieve an omni-directional propulsion mechanism 20 according to the present invention.

By controlling the amount of drive force applied by each of the first and second drive members 30 and 40, the speed and direction of rotation of the spherical ball 22 may be controlled and, hence, the direction of travel of the vehicle 10 is controlled. The propulsion mechanism 20 is omni-directional in that it may be steered in any direction three hundred sixty degrees (360°) relative to the horizontal ground reference plane. In doing so, it should be appreciated that each of the drive members 30 and 40 may be rotated in either clockwise or counterclockwise directions to achieve controlled omni-directional steering of the propulsion mechanism 20.

Figure 5:
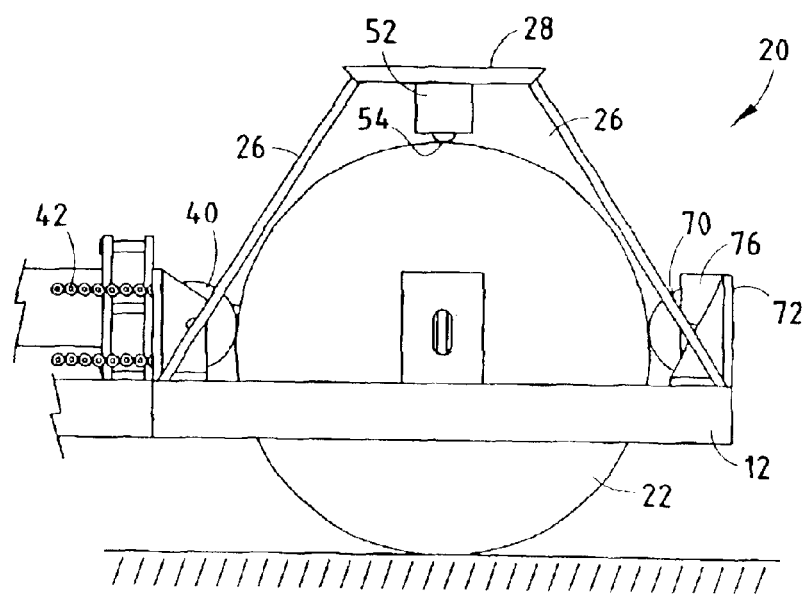
FIG. 5 is a side view of the propulsion mechanism.

Referring to FIG. 5, the friction reducing load members 70 and upper friction reducing caster assembly 52 are further illustrated for positioning the spherical ball 22 within the frame 12 in a low friction arrangement. The drive wheel 40 shown has a diameter about thirty percent (30%) of the diameter of the spherical ball 22. The friction reducing load member 70 is preloaded to contact the spherical ball 22 one hundred eighty degrees (180°) on the opposite side from the drive wheel 40. The drive wheel 30 and load wheel 60 are of similar size and are similarly located, but rotated by ninety degrees (90°). The drive wheels 30 and 40 and load wheels 60 and 70 are positioned to contact the spherical ball 22 at or near the equator of the ball 22. As shown, the upper friction reducing member 52 includes a lower extending freely rotatable ball 54 held within a caster assembly for engaging the upper surface of spherical ball 22. Ball 54 allows spherical ball 22 to rotate freely in any direction.

While first and second drive wheels 30 and 40 are shown and described herein for actuating the spherical ball 22 in any of a number of directions, it should be appreciated that other drive members, such as spherical balls, may be employed to rotate the spherical ball 22. While friction reducing load members 60 and 70 are shown and described herein, it should be appreciated that other load members may be employed, such as biased caster assemblies. According to another embodiment, the load members 60 and 70 may be powered drive members similar to drive wheels 30 and 40.

Accordingly, the propulsion mechanism 20 of the present invention allows for omni-directional drive and steering of a vehicle 10, by employing a spherical ball 22 that is rotated and propelled within the socket 24 of the vehicle frame 12 in any direction parallel to the horizontal ground plane. It should be appreciated that the spherical ball 22 may be controlled so as to change direction very quickly, by simply controlling the direction and speed of the drive members 30 and 40, thus providing a highly mobile drive platform. While first and second propulsion mechanisms 20 are shown and described herein in connection with a robotic vehicle 10, it should be appreciated that any of a number of one or more drive mechanisms 20 may be employed to drive and steer any vehicle 10. It should further be appreciated that a number of vehicles may employ one or more of the propulsion mechanisms 20 according to the present invention, including but not limited to passenger vehicles, including cars and scooters, industrial machinery, and robots.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A propulsion mechanism for driving a vehicle having a frame and a socket provided in the frame, said propulsion system comprising:
   a spherical ball disposed within the socket and adapted to frictionally engage a surface;
   a first powered drive member frictionally engaged with the spherical ball and powered to rotate the spherical ball to propel the vehicle;
   a second powered drive member frictionally engaged with the spherical ball and powered to rotate the spherical ball to propel the vehicle, wherein the first powered drive member drives the spherical ball in a first direction and the second powered drive member drives the spherical ball in a second directions;
   a first friction reducing load member located substantially on the opposite side of the spherical ball from the first drive member; and
   a second friction reducing load member located substantially on the opposite side of the spherical ball from the second drive member.

2. The propulsion mechanism as defined in claim 1, wherein the first drive member comprises a first drive wheel, and the second drive member comprises a second drive wheel.

3. The propulsion mechanism as defined in claim 1 further comprising a first motor for powering the first drive member, and a second motor for powering the second drive member.

4. A propulsion mechanism for driving a vehicle having a frame and a socket provided in the frame, said propulsion system comprising:
   a spherical ball disposed within the socket and adapted to frictionally engage a surface;
   a first powered drive member frictionally engaged with the spherical ball and powered to rotate the spherical ball to propel the vehicle;
   a second powered drive member frictionally engaged with the spherical ball and powered to rotate the spherical ball to propel the vehicle, wherein the first powered drive member drives the spherical ball in a first direction and the second powered drive member drives the spherical ball in a second direction; and
   a friction reducing member located between the spherical ball and the frame of the vehicle.

5. A propulsion mechanism for driving a vehicle having a frame and a socket provided in the frame, said propulsion system comprising:
   a spherical ball disposed within the socket and adapted to frictionally engage a surface;
   a first powered drive member frictionally engaged with the spherical ball and powered to rotate the spherical ball to propel the vehicle; and
   a second powered drive member frictionally engaged with the spherical ball and powered to rotate the spherical ball to propel the vehicle, wherein the first powered drive member drives the spherical ball in a first direction and the second powered drive member drives the spherical ball in a second direction, and wherein the first direction is offset from the second direction.

6. The propulsion mechanism as defined in claim 5, wherein the first and second directions are substantially orthogonal.

7. A propulsion mechanism for driving a vehicle having a frame and a socket provided in the frame, said propulsion mechanism comprising:
   a spherical ball disposed in the socket;
   a friction reducing member disposed between the spherical ball and the frame for allowing the spherical ball to rotate relative to the frame; and
   a powered drive member frictionally engaged with the spherical ball and powered to rotate the spherical ball to drive the vehicle.

8. The propulsion mechanism as defined in claim 7, wherein the powered drive member comprises a first powered wheel for rotating the spherical ball in a first direction.

9. The propulsion mechanism as defined in claim 7, wherein the friction reducing member comprises a load wheel located substantially on the opposite side of the spherical ball as compared to the powered drive member.

10. The propulsion mechanism as defined in claim 7, wherein the drive member comprises a first drive wheel for rotating the spherical ball in a first direction and a second drive wheel for rotating the spherical ball in a second direction.

11. The propulsion mechanism as defined in claim 10, wherein the first and second drive wheels are controlled to rotate the spherical ball in any of several directions.

12. A vehicle comprising:
   a frame;
   a socket provided in the frame;
   a first spherical ball disposed within the socket and adapted to frictionally engage a surface;
   a friction reducing assembly disposed between the spherical ball and the frame for allowing the spherical ball to rotate relative to the frame;
   a first powered drive member frictionally engaged with the spherical ball and powered to rotate the spherical ball to propel the vehicle; and
   a second powered drive member frictionally engaged with the spherical ball and actuatable to rotate the spherical ball to propel the vehicle, wherein the first powered drive member drives the spherical ball in a first direction and the second powered drive member drives the spherical ball in a second direction.

13. The vehicle as defined in claim 12, wherein the friction reducing assembly comprises a first load member located substantially on an opposite side of the spherical ball from the first drive member, and a second load member located substantially on an opposite side of the spherical ball from the second drive member.

14. The vehicle as defined in claim 13, wherein the friction reducing assembly further comprises a caster located between the frame and the spherical ball.

15. The vehicle as defined in claim 12, wherein the first drive member comprises a first drive wheel, and the second drive member comprises a second drive wheel.

16. The vehicle as defined in claim 12, wherein the first and second drive wheels are controlled to rotate the spherical ball in any of several directions.

17. The vehicle as defined in claim 12 further comprising:
a second socket provided in the frame;
a second spherical ball disposed within a second socket and adapted to frictionally engage a surface;
a second friction reducing assembly disposed between the second spherical ball and the frame for allowing the second spherical ball to rotate relative to the frame;
a third powered drive member frictionally engaged with the second spherical ball and powered to rotate the second spherical ball to propel the vehicle; and
a fourth powered drive member frictionally engaged with the second spherical ball and powered to rotate the second spherical ball to propel the vehicle, wherein the third powered drive member and the second powered drive member drive the second spherical ball in separate directions.

* * * * *